United States Patent Office 2,923,683
Patented Feb. 2, 1960

2,923,683

ANTIMONY-MODIFIED CHROMIUM OXIDE FERROMAGNETIC COMPOSITIONS, THEIR PREPARATION AND USE

John N. Ingraham and Thomas J. Swoboda, Wilmington, Del., assignors to E. I. du Pont de Nemours and Company, Wilmington, Del., a corporation of Delaware No Drawing. Application June 19, 1957
Serial No. 666,744

15 Claims. (Cl. 252—62.5)

This invention relates to ferromagnetic materials and their preparation. More particularly, it relates to a new type of ferromagnetic chromium oxide, to a method for its preparation, and to magnetic recording members having this new type of ferromagnetic chromium oxide as the magnetic component.

Ferromagnetic materials are employed in a variety of applications. For example, these materials are used in magnetic sound recording tapes, drums and records, memory devices, microwave circuitry, and as magnetic cores, such as coil cores in electronic equipment. In some of these applications, especially those requiring magnetic materials of low loss characteristics at high frequencies, or of relatively high coercivity, ferromagnetic oxides are normally more useful than ferromagnetic metals. Heretofore only cobalt, nickel or iron alloys, or magnetic iron oxides have been used in the manufacture of magnetic recording tapes.

Among the known ferromagnetic oxides is chromium dioxide. However, commonly known forms of this oxide have not possessed the purity, magnetic properties, and uniform small particle size which would make them useful in certain practical applications such as, for example, in the manufacture of magnetic recording tapes and magnetic memory cores for computers and gyrator elements.

Recently several forms of ferromagnetic chromium oxides having certain combinations of properties making them particularly useful in specific applications have been prepared. These new chromium oxides have had average particle sizes less than 10 microns in length and have had a tetragonal crystal structure.

One of these forms of ferromagnetic chromium oxides has an elongated shape (the length being 2–6 times the width) and is fully described and claimed in United States patent application Serial No. 515,521, filed June 14, 1955 by Paul Arthur, Jr.

Another of these new ferromagnetic chromium oxides has the same general particle length but usually a more acicular shape and contains a small amount of an alkali metal as an integral substituent of the crystal lattice. This latter type is described and claimed in United States patent application Serial No. 515,523, filed June 14, 1955 by Thomas J. Swoboda, now abandoned, of which U.S. application Serial No. 756,296, filed August 21, 1958 is a continuation-in-part.

Still another of these new ferromagnetic chromium oxides contains 0.008 to 4.4% of ruthenium and 58.4 to 61.9% chromium. These ruthenium-modified chromium oxides also have a tetragonal crystal structure, but the particles have an average length less than 2 microns with the ratio of length to width, ranging from 4 to 35:1. They also possess higher coercivity than the other two types of chromium oxides, values of intrinsic coercive force ranging from 140–400 oersteds being exhibited. Such high coercivity, in combination with high specific magnetization values, are highly desirable for use in magnetic recording tapes. The ruthenium-modified chromium oxides are described and claimed in United States patent application Serial No. 617,283, filed October 22, 1956 by A. L. Oppegard, now U.S. Patent No. 2,885,365.

Another ferromagnetic chromium oxide of tetragonal crystal structure and acicular particle shape, and also exhibiting high coercivity and specific magnetization values, is described and claimed in United States patent application Serial No. 666,745, filed concurrently herewith by John N. Ingraham. This particular type of chromium oxide contains 0.4% to 5.0% tin and 55.0% to 61.5% chromium.

However, the methods for making the aforementioned ferromagnetic chromium oxides of high coercivity and specific magnetization require the use of relatively high operating pressures, e.g., pressures ranging from 200–3000 atmospheres. It is therefore a desirable goal, particularly in view of the potential importance of ferromagnetic chromium oxides in various applications, to develop other methods for making ferromagnetic chromium oxides, especially methods requiring substantially lower pressures since equipment capable of operation at the extremely high pressures required for the prior methods is quite heavy and expensive. It is also desirable to provide ferromagnetic chromium oxides having a specific combination of magnetic properties which make individual product useful in specific applications.

It is an object of this invention to provide ferromagnetic materials or compositions of high coercive force and a method for their preparation. A further object is to provide a new type of ferromagnetic chromium oxide of high coercive force and method for its preparation. A still further object is to provide a novel process for preparing a ferromagnetic chromium oxide of high coercive force. Another object is to provide a new type of ferromagnetic chromium oxide which is especially useful in the manufacture of magnetic recording tapes and in the manufacture of ceramic bodies such as magnetic cores. Still another object is to provide a magnetic recording member having a magnetic track comprising this new type of ferromagnetic chromium oxide. Other objects will appear hereinafter.

These and other objects of this invention are accomplished by providing ferromagnetic chromium oxides having a tetragonal crystal structure and containing 42.5–61.8% chromium and 0.05–25% antimony as an integral part of the crystal structure, i.e., the antimony occupies spaces in the crystal lattice normally occupied by chromium. A preferred class of products contains 50.0–61.8% chromium and 0.05–15% antimony.

The antimony-modified chromium oxides of this invention possess a high coercivity, i.e., they have intrinsic coercive forces ranging from 100–400 oersteds. They also exhibit specific magnetizations, or sigma values ($\sigma s$) as they are also called, ranging up to 85 electromagnetic units per gram (E.M.U./g.). The products of this invention have Curie temperatures of 128–131° C.

These antimony-modified chromium oxides are produced in a form which consists essentially of small acicular particles having an average length of not more than 2 microns, with no more than 10% of the particles being longer than 2 microns, and having an average axial ratio, i.e., the ratio of length to width, of about 10:1.

In view of the particular magnetic and physical properties possessed by the antimony-modified chromium oxides of this invention, particularly the high coercivity and the small acicular shape, they are especially useful as the magnetic material in magnetic recording members. Accordingly, the present invention includes magnetic recording members which comprise a carrier, such as a tape, drum or record, of non-magnetic material having bonded thereto a magnetic track of the ferromagnetic chromium oxides of this invention and a binder therefor.

The new ferromagnetic chromium oxide compositions of this invention are prepared by the novel process which comprises heating chromium trioxide, $CrO_3$, with from 0.05–25% (based on the weight of chromium trioxide) of antimony or an antimony compound at a temperature within the range of 225° to 500° C. in the presence of water or lithium nitrate as the reaction medium, and separating and drying the resulting antimony-modified ferromagnetic chromium oxide.

The reaction can be carried out over a wide range of pressures. Pressures ranging from 1 to 3000 atmospheres, or more, are operable. Pressures of 1 to 1000 atmospheres are especially useful while pressures of 1 to 200 atmospheres are preferred since they do not require the use of the extremely heavy and expensive equipment required for operation at the higher pressures.

As indicated above, reaction temperatures can range from 225–500° C.; however, temperatures of 250–400° C. are preferred. The lower temperatures in this range, i.e., 225–350° C., are especially useful when operating pressures of 1 to 200 atmospheres are employed. Temperatures above 500° C. are undesirable since they cause decomposition of the ferromagnetic chromium oxides.

The reaction time is not critical in the process of this invention. Reaction times ranging from 10 minutes or less to 3 hours or more at the reaction temperature of 225–500° C. are satisfactory.

The amount of water or lithium nitrate used as the reaction medium in the process of this invention carried out under superatmospheric pressure can range from about 0.05 to about 6.0 parts for each part of chromium trioxide. Preferably, an amount of water or lithium nitrate ranging from 15–125% of the weight of the chromium trioxide is used. Lithium nitrate is an especially useful reaction medium in certain circumstances, for example, it is especially effective when operating at 300° C. and 100 atmospheres pressure. Lithium nitrate exerts a lower pressure at a given operating temperature than water and is therefore preferred when low operating pressures are desired. When the process is carried out at atmospheric pressure, the amount of water is not critical, and can vary widely. An atmosphere of steam is very satisfactory.

A convenient method for carrying out the process of this invention at atmospheric pressure comprises charging a corrosion-resistant reaction vessel, that is, one made of a material that is inert to the reactants under the operating conditions, for example, glass or stainless steel, with an intimate mixture of chromium trioxide and finely divided antimony or an antimony compound, e.g., antimony trioxide, in amount such that said mixture contains 0.05% to 25% antimony based on the weight of chromium trioxide. The reaction vessel and its contents are then heated to about 300° C. while a stream of superheated steam (at 320° C.) is directed against the surface of the reaction mixture. When the temperature of the reaction mixture reaches about 300° C. an exothermic reaction takes place with a rapid evolution of gas. The temperature of the reaction mixture rises rapidly to about 400° C. After a few minutes, e.g., 10 minutes, the reaction subsides. The product is a ferromagnetic antimony-modified chromium oxide. The product can be used directly or it can be subjected to a purification involving several successive treatments with boiling water followed by drying.

A convenient method for carrying out the process of this invention under superatmospheric pressure involves the use of a corrosion-resistant container of the type that is placed inside a larger pressure vessel which is used to apply the desired pressure to the container holding the reactants. Satisfactory containers of this type are made of platinum or of the alloy known commercially as "Hastelloy" C. The container can be a completely sealed tube having flexible walls or it can be any type of vessel permitting transmission of the desired pressure to the reaction system, such as a cylindrical tube closed at one end and equipped at the other end with a closely fitted piston.

The container is charged with chromium trioxide, finely divided antimony or an antimony compound and water or lithium nitrate in the proportions defined previously. The corrosion-resistant container is closed and placed inside a larger vessel capable of withstanding high temperatures and pressures. The outer vessel is then closed and pressured with an inert medium, e.g., water or helium so that at the operating temperature the pressure will be at the desired value. Alternatively, a single reaction vessel having a corrosion-resistant lining, and capable of withstanding superatmospheric pressure can be used in the process of this invention.

The reaction vessel is heated to the desired temperature, preferably 250–400° C., for the desired time, e.g., 1–3 hours. Longer times are not necessary to form the ferromagnetic antimony-modified chromium oxides of this invention. The time of heating the reaction vessel to the reaction temperature and the time of cooling it back after the reaction is completed can vary considerably, depending on the size of the vessel and of the charge, and on the capacity of the heating and cooling equipment. However, it is preferred that heating to reaction temperature be completed in less than 1 hour and that cooling be completed in 24 hours, or less.

After the reaction mixture has been heated to the desired temperature for the desired time, the entire vessel is cooled with the pressure maintained until room temperature, about 25° C., is reached. The pressure is then released and, if a sealed corrosion-resistant vessel is employed, this may result in the vessel being ruptured by the by-product oxygen present in the container. The resultant slightly compacted or aggregated black acicular chromium oxide is separated from the dark aqueous phase (if water is used as reaction medium) by filtration and is then washed and dried. A convenient way of doing this is to break up the lumps of crude reaction product in a mortar. This treatment merely breaks up the aggregates; it does not reduce the size or change the shape of individual particles. If lithium nitrate is used as the reaction medium, it can be removed from the ferromagnetic chromium oxide product by extraction of the crude reaction mixture with water. The finely divided product is then washed by immersing it in distilled water and heating the water to boiling, followed by filtration. The washing in distilled water is repeated two more times and then the product is collected on a filter, rinsed thoroughly with distilled water, and finally with acetone, then allowed to air-dry. Preferably, the product is dried more thoroughly at elevated temperatures and reduced pressure.

It is believed that the antimony in the ferromagnetic products of this invention is present in positions in the crystal lattice normally occupied by chromium atoms. This is indicated by the inability to recover antimony from the products by washing, magnetic separation, or by other methods. Furthermore, the known formation of a double rutile, $CrSbO_4$, which has a rutile-type structure, is indicated that such substitution can occur.

The chromium trioxide, antimony, antimony compounds, and lithium nitrate used in the process of this invention can be of the grades commercially available.

As indicated hereinbefore, the ferromagnetic, antimony-modified chromium oxides of this invention possess a number of properties or characteristics which make them especially suitable for use in certain applications. In addition to their being of very small particle size, i.e., having an average length between about 0.5 and 2.0 microns, the crystals are acicular in shape. This acicular shape makes them especially well suited for use in coating compositions applied on films, tapes or other substrates. As a result of the acicular shape, the particles can be oriented in closer relationship during mechanical spreading of the oxide composition in thin layers on a substrate. This in turn results in more uniform magnetic characteristics of the coated substrate.

The tetragonal crystal structure of the chromium oxides of this invention is of the rutile type, i.e., it has the same type of crystal structure as rutile, $TiO_2$. Ferromagnetic chromium oxides prepared by hitherto known methods have also exhibited the tetragonal crystal structure, but in all oxides other than those of the aforementioned Arthur, Swoboda, Oppegard and Ingraham applications, other crystal structures have always been associated with the rutile-type structure, e.g., the corundum-type hexagonal crystal structure of $Cr_2O_3$. In contrast, the ferromagnetic chromium oxides of this invention have only a single crystal structure, as shown by X-ray diffraction, and this is the tetragonal crystal structure of the rutile-type.

The ferromagnetic, antimony-modified chromium oxides of this invention exhibit several magnetic characteristics which make them especially valuable for use in various specific applications. These particular properties, whch have been mentioned previously, and which are critical factors in their usefulness in magnetic applications, are the intrinsic coercive force, $H_{ci}$, and the specific magnetization (or sigma value), $\sigma s$. The definition of the intrinsic coercive force is given in Special Technical Publication No. 85 of the American Society for Testing Materials, entitled "Symposium on Magnetic Testing" (1948), pp. 191–198. The values for the intrinsic coercive force given herein are determined on a D.C. ballistic-type apparatus which is a modified form of the apparatus described by Davis and Hartenheim in the Review of Scientific Instruments 7, 147 (1936). The sigma value, $\sigma s$, is defined on pages 7 and 8 of Bozorth's "Ferromagnetism," D. Van Nostrand Co., New York, 1951. This sigma value is equal to the intensity of magnetization, $I_s$, divided by the density, $d$, of the material. The sigma values given herein are determined on apparatus similar to that described by T. R. Bardell on pp. 226–228 of "Magnetic Materials in the Electric Industry," Philosophical Library, New York, 1955.

The antimony-modified, ferromagnetic chromium oxides of this invention have intrinsic coercive forces ranging from 100–400 oersteds and have specific magnetizations ranging up to 85 E.M.U./g. Those specific products having intrinsic coercive forces of 170–250 oersteds and having sigma values of 60–85 E.M.U./g. are particularly suitable for use as the magnetic component in magnetic recording tapes. Those antimony-modified chromium oxides having lower coercivity, i.e., intrinsic coercive forces of around 100 oersteds are particularly useful for magnetic cores.

The invention is illustrated further by the following examples in which the proportions of ingredients are expressed in parts by weight unless otherwise noted.

EXAMPLE I

Fifty parts of chromium trioxide and 1 part of antimony trioxide are mixed together uniformly and placed in a glass container equipped with external heating means. Heat is applied and a stream of superheated steam (at a temperature of 320° C.) is directed against the surface of the reaction mixture. When the temperature of the mixture reaches about 300° C., an exothermic reaction occurs, causing the temperature to rise to about 340° C. in about 1 minute. This reaction is accompanied by a rapid evolution of gas. Heating at 300–340° C. is continued for 1 hour 40 minutes and the reaction mixture is then cooled to room temperature. The product, an antimony-modified chromium oxide, is a black, strongly magnetic solid which in the crude state has an intrinsic coercive force of 104 oersteds and a specific magnetization, $\sigma s$, of 66.5 E.M.U./g.

EXAMPLE II

Thirty parts of chromium trioxide, 0.09 part of antimony trioxide (0.3% of weight of $CrO_3$) and 5.1 parts of water are placed in a flexible walled platinum tube and the tube is then hermetically sealed. The tube is placed in a pressure vessel capable of withstanding high pressures and a pressure of helium amounting to 700 atmospheres is applied. The reaction vessel is heated to 400° C., the pressure being vented from time to time to maintain a pressure below 800 atmospheres. A temperature of 398–403° C. and a pressure of 750–800 atmospheres are maintained for a period of 3 hours, after which the reaction vessel is cooled and the pressure released carefully. The platinum tube is removed and the contents are boiled in three changes of distilled water. After drying, the product is a black strongly magnetic acicular chromium oxide, having an intrinsic coercive force of 193 oersteds and a specific magnetization, $\sigma s$, of 80.4 E.M.U./g. The product contains 61.75% chromium, 0.29% antimony, and 0.39% water.

EXAMPLE III

The antimony-modified, ferromagnetic chromium oxide of Example II is employed in the preparation of a magnetic recording tape as follows: Ten parts of this ferromagnetic chromium oxide is dispersed in 35 parts of a 1:1 toluene/tertiary butyl alcohol mixture containing 0.03 part of cetyldimethylamine by milling for four days in a glass jar containing 140 parts of glass beads. To the resulting dispersion is added 21.6 parts of a 20% solution of polyvinyl butyral in 1:1 toluene/tertiary butyl alcohol mixture containing one part of dibutyl sebacate, and milling is continued for an additional 1.5 hours. The dispersion is filtered through layers of cotton, felt and cloth, then degassed and coated onto a 1-mil polyethylene terephthalate tape by means of a doctor knife set at 6 mils clearance. Half of the tape (A) is coated in the absence of a magnetic field and the other half of the tape (B) is coated in a magnetic field produced by a solenoid operated at 100 volts. The thickness of the magnetic coating on film A is 0.6 mil and on film B is 0.6–0.65 mil, after drying.

The tapes prepared as described above are tested for performance in a magnetic tape recorder ("Ampex No. 307") at a tape speed of 30 inches per second with optimum bias current. The tape is subjected to a constant sound input at several frequencies between 1 and 20 kilocycles. The unequalized output signals at these different frequencies are then measured, and the results are tabulated below.

*Table I*

OUTPUT AT VARIOUS FREQUENCIES

| Frequency (kc.) | Output (db) | |
|---|---|---|
| | Tape A | Tape B |
| 1 | −18.5 | −16.0 |
| 2 | −13.9 | −11.2 |
| 4 | −10.0 | −8.6 |
| 8 | −9.8 | −9.0 |
| 10 | −10.5 | −9.6 |
| 15 | −15.0 | −13.2 |
| 20 | −18.6 | −16.8 |
| * * | * | * |
| Input (constant at all frequencies) | 11.0 | 9.5 |

EXAMPLES IV–XII

The effects of different proportions of antimony, different reaction media, and different reaction conditions on the process of this invention are illustrated by Examples IV–XII, which are summarized in Table II. The general procedure of Example II is followed with specific variations noted in this table. Unless otherwise noted, the reaction condition variations are ±5° C. and ±20 atmospheres. The properties of the resulting ferromagnetic, antimony-modified chromium oxides are also summarized in Table II.

$Sb_2(SO_4)_3$, $Sb(NO_3)_3$, $CrSbO_4$ and $M[Sb(SO_4)_2]$, where M is an alkali metal.

*Table II*

CHROMIUM TRIOXIDE HEATED WITH ANTIMONY TRIOXIDE

| Exam. No. | $Sb_2O_3$ Modifier, Percent [a] | Reaction Medium, Percent [a] | | Reaction Conditions, Temp./Pres./Time, ° C./atm./hrs. | Properties of Product | | | | | |
|---|---|---|---|---|---|---|---|---|---|---|
| | | | | | Composition | | | Magnetic | | |
| | | | | | Cr, Percent | Sb, Percent | $H_2O$, Percent | Curies Temp., ° C. | $H_{ci}$, Oersteds | σs, E.M.U./g. |
| IV | 0.5 | $H_2O$ | 17 | 250/50/3 | | | | | 204 | 60.0 |
| V | 1.0 | $LiNO_3$ | 65 | 350/100/3 | | | | 128 | 338 | 65.8 |
| VI | 0.2 | $H_2O$ | 17 | 400/750/3 | | | | | 137 | 83.3 |
| VII | 1.0 | $H_2O$ | 17 | 350/740/3 | | | | | 377 | 62.3 |
| VIII | 2.0 | $H_2O$ | 17 | 400/760/3 | 55.08 | 2.09 | [d] 1.43 | 128 | 298 | 70.8 |
| IX | 2.0 | $H_2O$ | 17 | 450/750/3 | | | | | 308 | 64.3 |
| X | [b] 0.1 | $H_2O$ | 17 | 400/760/3 | | 0.08 | 0.21 | | 178 | 77.3 |
| XI | 7.7 | $H_2O$ | 17 | 405 [c]/750/3 | 54.77 | 7.35 | [d] 2.53 | 131 | 263 | 51.4 |
| XII | 16.3 | $H_2O$ | 18.3 | 405 [c]/750/3 | 49.30 | 13.2 | 2.97 | 131 | 279 | 38.3 |

[a] Percent modifier based on weight of $CrO_3$.
[b] In this example a mixed chromium antimony oxide is prepared by heating $CrO_3$ and $Sb_2O_3$ in a 8:1 molar ratio at 405° C. ±10° C. and 750 atm. pressure for 3 hours. The resulting product contains 29.5% $Sb_2O_3$, and is used in amount of 0.367% of the weight of $CrO_3$ as the modifier in Example X (which corresponds to about 0.1% $Sb_2O_3$ based on $CrO_3$).
[c] Temperature variations ±10° C.
[d] X-ray diffraction shows only the pattern for the rutile-type tetragonal crystal structure.

EXAMPLES XIII–XVIII

The effects of different antimony compounds on the process of this invention are summarized in Table III. The examples are carried out by the general procedure described in Example II using the specific antimony compounds in the proportions listed in the table under reaction conditions of 400°±10° C. and 740±40 atmospheres for three hours. The properties of the resulting antimony-modified, ferromagnetic chromium oxides are also summarized in the table. All the reactions are carried out in the presence of 17% (based on weight of chromium trioxide) water.

An important advantage of the process of this invention over the best of the hitherto known methods of making ferromagnetic chromium oxides of high coercivity resides in its being a lower cost process. Antimony oxide and other antimony compounds are less expensive than ruthenium dioxide. Another advantage is that by selection of specific antimony compound and proper antimony proportions it is possible to obtain antimony-modified chromium oxides with many different combinations of such properties as saturation magnetization, coercivity, and permeability.

While the ferromagnetic antimony-modified chromium

*Table III*

CHROMIUM TRIOXIDE HEATED WITH VARIOUS ANTIMONY COMPOUNDS

| Example No. | Modifier, Percent [a] | | Properties of Product | | |
|---|---|---|---|---|---|
| | | | Composition, Sb, Percent | Magnetic | |
| | | | | $H_{ci}$, Oersteds | σs, E.M.U./g. |
| XIII | Sb (metal) | 2 | | 310 | 66.6 |
| XIV | $SbF_3$ | 2 | | 213 | 53.0 |
| XV | $SbCl_3$ | 2 | | 208 | 34.6 |
| XVI | $Sb_2S_3$ | 2 | | 295 | 49.2 |
| XVII | $Sb_2O_3/Sb_2S_3$ (50/50) | 2 | | 310 | 51.3 |
| XVIII | $(SbO)_2SO_4$ | 2 | [b] 1.5 | 317 | 57.6 |

[a] Percent modifier based on weight of $CrO_3$.
[b] X-ray diffraction shows the pattern for a tetragonal crystal structure of the rutile-type, plus one weak unidentified line at 3.217A.

The examples have illustrated the process of this invention by the use of antimony oxide, antimony metal and other antimony compounds as the modifiers. However, the process is not limited to these specific antimony compounds. Examples of other antimony compounds which can be used include: meta-antimonic acid ($HSbO_3$), ortho-antimonic acid ($H_3SbO_4$), pyroantimonic acid ($H_4Sb_2O_7$), and their salts, especially the alkali metal and tin antimonates; orthoantimonous acid ($H_3SbO_3$) and its salts, especially the alkali metal and tin antimonites; hexachloro- and hexafluoroantimonic acids ($HSbCl_6$ and $HSbF_6$) and their salts with alkali metals; complex antimony halides, e.g., $MSbF_4$, $M_2SbCl_5$, $M_3SbCl_6$ and $M_2SbCl_6$, where M is an alkali metal; basic antimony salts, e.g., basic antimonyl sulfate, chloride, nitrate and carbonate; antimony oxides, e.g., antimony pentoxide and antimony tetroxide; and the following miscellaneous compounds: $SbF_5$, $Sb_2Se_3$, $Sb_2Te_3$, SnSb, oxides of this invention are especially valuable for use in magnetic recording tapes, drums and records, they are also useful in other applications. For example, they are useful in the manufacture of ceramic bodies, such as magnetic cores, when they are compacted into shaped objects having approximately the theoretical density. In the compacted form they are useful in magnetic memory cores for computers, in gyrator elements, in electrically operated high frequency switches and in low cost transformer cores for megacycle/second frequency ranges. The antimony-modified chromium oxides of this invention are also useful as focusing magnets and in microwave attenuators.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. An antimony-modified chromium oxide ferromagnetic composition containing 42.5% to 61.8% by weight of chromium combined with oxygen and 0.05% to 25% by weight of antimony combined with oxygen and consisting essentially of small acicular particles of tetragonal crystal structure.

2. A magnetic recording member which comprises a carrier of non-magnetic material having bonded thereto a magnetic track of an antimony-modified chromium oxide ferromagnetic composition as set forth in claim 1.

3. An antimony-modified chromium oxide ferromagnetic composition containing 50.0% to 61.8% by weight of chromium combined with oxygen and 0.05% to 15% by weight of antimony combined with oxygen and consisting essentially of small acicular particles of tetragonal crystal structure having an average length of not more than 2 microns with no more than 10% of the particles having a length greater than 2 microns.

4. An antimony-modified chromium oxide ferromagnetic composition as set forth in claim 3 in which said ferromagnetic composition has an intrinsic coercive force within the range of 170 to 250 oersteds and a sigma value within the range of 60 to 85 electromagnetic units/gram.

5. A magnetic recording member which comprises a carrier of non-magnetic material having bonded thereto a magnetic track of an antimony-modified chromium oxide ferromagnetic composition as set forth in claim 3 in which said antimony-modified chromium oxide ferromagnetic composition has an intrinsic coercive force within the range of 170 to 250 oersteds and a sigma value within the range of 60 to 85 electromagnetic units/gram.

6. An antimony-modified chromium oxide ferromagnetic composition containing 42.5% to 61.8% by weight of chromium combined with oxygen and 0.05% to 25% by weight of antimony combined with oxygen, having an intrinsic coercive force within the range of 100 to 400 oersteds, and consisting essentially of small acicular particles of tetragonal crystal structure having an average length within the range of 0.5 to 2.0 microns.

7. An antimony-modified chromium oxide ferromagnetic composition consisting essentially of small acicular particles of tetragonal crystal structure having an average length of not more than 2 microns with no more than 10% of the particles having a length greater than 2 microns and having an average axial ratio of about 10:1, said antimony-modified chromium oxide ferromagnetic composition containing 50.0% to 61.8% by weight of chromium and 0.05% to 15% by weight of antimony each combined with oxygen as an integral part of the crystal structure and showing by X-ray diffraction only a single crystal structure and that the tetragonal crystal structure.

8. A magnetic recording member which comprises a carrier of non-magnetic material having bonded thereto a magnetic track of an antimony-modified chromium oxide ferromagnetic composition as set forth in claim 6.

9. A magnetic recording member which comprises a carrier of non-magnetic material having bonded thereto a magnetic track of an antimony-modified chromium oxide ferromagnetic composition as set forth in claim 7.

10. Process which comprises heating at a temperature within the range of 225° to 500° C. a mixture of chromium trioxide and a member of the group consisting of antimony and antimony-containing compounds in contact with a medium selected from the class consisting of water and lithium nitrate, the amount of antimony in said mixture being from 0.05% to 25% based on the weight of chromium trioxide, and separating and drying as the resulting product an antimony-modified chromium oxide ferromagnetic composition of tetragonal crystal structure containing 42.5% to 61.8% by weight of chromium and 0.05% to 25% by weight of antimony each combined with oxygen as an integral part of the crystal structure.

11. Process as set forth in claim 10 wherein said mixture is heated at a temperature within the range of 250° to 400° C.

12. Process which comprises heating at a temperature within the range of 225° to 500° C. and under a pressure of 1 to 3000 atmospheres, a mixture of chromium trioxide and a member of the group consisting of antimony and antimony-containing compounds in contact with water in amount of from 0.05 to 6.0 parts for each part of chromium trioxide in said mixture, the amount of antimony in said mixture being from 0.05% to 25% based on the weight of chromium trioxide, and separating and drying as the resulting product an antimony-modified chromium oxide ferromagnetic composition of tetragonal crystal structure containing 42.5% to 61.8% by weight of chromium and 0.05% to 25% by weight of antimony each combined with oxygen as an integral part of the crystal structure.

13. Process which comprises heating at a temperature within the range of 225° to 500° C. and under a pressure of 1 to 3000 atmospheres, a mixture of chromium trioxide and antimony trioxide in contact with water, the amount of antimony in said mixture being from 0.05% to 25% based on the weight of chromium trioxide, and separating and drying as the resulting product an antimony-modified chromium oxide ferromagnetic composition of tetragonal crystal structure containing 42.5% to 61.8% by weight of chromium and 0.05% to 25% by weight of antimony each combined with oxygen as an integral part of the crystal structure.

14. Process which comprises heating at a temperature within the range of 250° to 400° C. and under a pressure of 1 to 200 atmospheres, a mixture of chromium trioxide and antimony trioxide in contact with lithium nitrate in amount within the range of 15% to 125% by weight of chromium trioxide in said mixture, the amount of antimony in said mixture being from 0.05% to 25% based on the weight of chromium trioxide, and separating and drying as the resulting product an antimony-modified chromium oxide ferromagnetic composition of tetragonal crystal structure containing 42.5% to 61.8% by weight of chromium and 0.05% to 25% by weight of antimony combined with oxygen as an integral part of the crystal structure.

15. Process which comprises heating at a temperature within the range of 250° to 400° C. and under atmospheric pressure, a mixture of chromium trioxide and antimony trioxide in contact with steam, the amount of antimony in said mixture being from 0.05% to 25% based on the weight of chromium trioxide, and separating and drying as the resulting product an antimony-modified chromium oxide ferromagnetic composition of tetragonal crystal structure containing 42.5% to 61.8% by weight of chromium and 0.05% to 25% by weight of antimony combined with oxygen as an integral part of the crystal structure.

References Cited in the file of this patent

UNITED STATES PATENTS

| | | |
|---|---|---|
| 510,318 | Bertrand | Dec. 5, 1893 |
| 1,847,860 | Best | Mar. 1, 1932 |
| 2,579,267 | Leverenz et al. | Dec. 18, 1951 |

FOREIGN PATENTS

| | | |
|---|---|---|
| 524,107 | Belgium | Nov. 30, 1953 |

OTHER REFERENCES

Verway et al.: J. Chem. Phys., vol. 15, pp. 174–187, April 1947.

Kordes et al.: Chemical Abstracts, vol. 46, col. 4411, May 25, 1952.

Physical Reviews, vol. 90, pp. 487–489, May 1, 1953.